(12) United States Patent
Partida (10) Patent No.: US 9,058,258 B2
(45) Date of Patent: Jun. 16, 2015

(54) MOBILE DEVICE DIAGNOSIS: APPARATUS AND METHOD

(71) Applicant: BBY SOLUTIONS, INC., Richfield, MN (US)

(72) Inventor: Frank Partida, Farmington, MN (US)

(73) Assignee: BBY Solutions, Inc., Richfield, MN (US)

( * ) Notice: Subject to any disclaimer, the term of this patent is extended or adjusted under 35 U.S.C. 154(b) by 185 days.

(21) Appl. No.: 13/660,188

(22) Filed: Oct. 25, 2012

(65) Prior Publication Data

US 2014/0122688 A1   May 1, 2014

(51) Int. Cl.
| | |
|---|---|
| G06F 15/173 | (2006.01) |
| G06F 11/07 | (2006.01) |
| H04W 24/00 | (2009.01) |
| G06F 11/22 | (2006.01) |
| G06Q 10/00 | (2012.01) |

(52) U.S. Cl.
CPC .......... *G06F 11/0742* (2013.01); *H04W 24/00* (2013.01); *G06F 11/0793* (2013.01); *G06F 11/2294* (2013.01); *G06F 11/0748* (2013.01); *G06Q 10/00* (2013.01)

(58) Field of Classification Search
USPC ........................................................ 709/224
See application file for complete search history.

(56) References Cited

U.S. PATENT DOCUMENTS

| 8,655,336 | B1 * | 2/2014 | Dempski et al. .............. 455/418 |
| 2002/0065698 | A1 * | 5/2002 | Schick et al. ...................... 705/8 |
| 2012/0232961 | A1 * | 9/2012 | Wellman et al. ............. 705/7.38 |

OTHER PUBLICATIONS

Synapsy. EU, iPhone Diagnostic Software, https://www.youtube.com/watch?v=oPpTROJ48aQ, Aug. 2008.

* cited by examiner

*Primary Examiner* — Tu Nguyen
(74) *Attorney, Agent, or Firm* — Beck Tysver Evans PLLC (57) ABSTRACT

The present invention relates to diagnosis of issues of individual mobile electronic devices (e.g., cell phones, portable media players, or tablet or other computers). The issues are addressed by logic and data on the device and/or in a mobile device diagnosis center, possibly in collaboration. The center may contain information relating to such devices generally, as well as particular information relating to a device being diagnosed. The general information might include information about product specifications; statistical information based on data gathered about actual usage of such devices; information about service providers and service plans; and information about possible solutions for various kinds of issues. The device-specific information might include a history of the usage, repairs, and other activities and issues pertaining to the particular device. Diagnosis by the center may result in a recommendation to the device, which may automatically take action, possibly after backing itself up to the center.

35 Claims, 5 Drawing Sheets

MOBILE DEVICE DIAGNOSIS: APPARATUS AND METHOD

FIELD OF THE INVENTION

The present invention relates to diagnosis of mobile devices. More specifically, it relates to collaboration between individual devices and a center for diagnosis of such devices.

SUMMARY OF THE INVENTION

Diagnosis of issues of individual mobile electronic devices (e.g., cell phones, portable media players, or tablet or other computers) is described herein. The issues may be addressed by logic and data, by the device and/or a mobile device diagnosis center. The diagnosis center may contain information relating to such devices generally, as well as particular information relating to a device being diagnosed. The general information might include information about product specifications; statistical information based on data gathered about actual usage of such devices; information about service providers and service plans; and information about possible solutions for various kinds of issues. The device-specific information might include a history of the usage, repairs, and other activities and issues pertaining to the particular device. Diagnosis by the center may result in a recommendation to the device, which may automatically take action, possibly after backing itself up to the center. Such action may modify some configuration or functionality of the mobile device, or suggest some user action.

DETAILED DESCRIPTION OF EXEMPLARY EMBODIMENTS

This description provides embodiments of the invention intended as exemplary applications. The reader of ordinary skill in the art will realize that the invention has broader scope than the particular examples described here.

Figure 1:
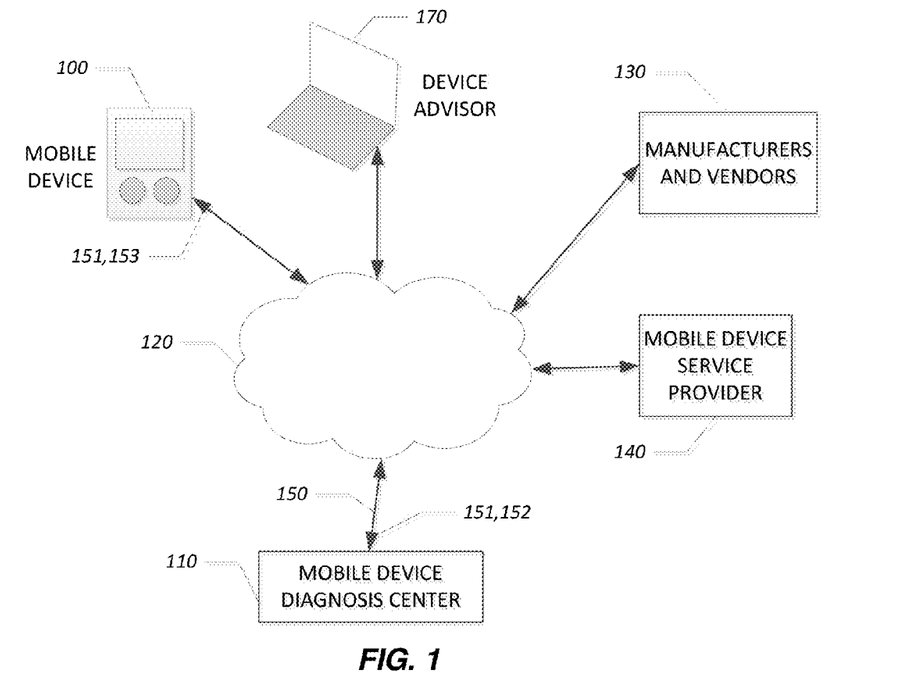
FIG. 1 is a schematic diagram illustrating communication between a mobile device diagnosis center and individual mobile devices, as well as various information sources.

FIG. 1 illustrates resources that can collaborate to diagnose a mobile electronic device 100 (herein also, a "mobile device 100" or a "device 100"); that is, to analyze some aspect of the device, and to recommend repairs or improvements. Examples of mobile electronic devices 100 include cell phones, portable media players, tablets and other portable computers. The mobile electronic device 100 in the figure typifies a plurality of such devices that may interact for purposes of diagnosis with a mobile device diagnosis center 110, which is a repository of information about mobile electronic devices 100.

A number of different kinds of information may be important for improving the usefulness or performance of a given mobile electronic device 100. If the device 100 uses a mobile device service plan for, say, cellular communication, then information about the service plan and the service plan provider 140 are relevant. The plan may set limits on particular kinds of usage (e.g., volume of data transferred per month, or number of text messages sent and received), and possibly impose charges, sometimes substantial ones, for exceeding the limits. A particular plan may be unsuited for a particular device (or group of devices in, say, a family plan), because usage may routinely exceed limits, or may be close to exceeding some limit in a current time period. On the other hand, a user may never come close to the limits of their plan, indicating a less expensive plan may be adequate. In a group plan, some particular users (e.g., teenagers in a family plan) may be causing particular limits to be exceeded. Information about the plan may be obtained from the service plan provider 140. Information about actual usage may be obtained by the center 110 from the mobile electronic device 100 itself.

Diagnostic facilities may be on the mobile electronic device 100 itself, or in a mobile device diagnosis center 110, or shared between them. A given facility may gather and/or use some or all of these types of data, and how the facility may exploit such types of data may vary. Note that a diagnosis may be triggered by a user request, by a problem recognized by logic on the device 100 or the center 110, or by some application or scan run occasionally or periodically.

Specifications about the device 100 itself, and about software applications (apps) installed on the device 100 may also be useful. For example, permissions associated with some app may be particularly intrusive from a privacy perspective, a fact that a user might want to know. Another example is an application that "hogs" one or more resources on the device 100. If a user has a particular goal that they want to achieve, then perhaps a change of device, or of installed software is warranted. Information about specifications of devices 100 and apps might be obtained by the device 100 or the center 110, for example, from manufacturers and vendors 130 of devices 100 or apps, or from service plan providers 140.

A user may have short-term needs for which they might want adjustments made to the mobile electronic device 100. For example, a user about to travel abroad might want to disable or limit functionality to keep unusual costs down. A device 100 may have the capability to receive a request to make appropriate changes, and do so automatically either using its logic on the device 100 and/or logic at the center 110. Alternatively, the user interface 254 may present the user with some options or suggestions.

For an individual mobile device 100, a mobile device diagnosis center 110 may maintain a history of changes made to the device, such as repairs, recommendations made, service plans and providers, and user satisfaction about various aspects of the device 100, usage, apps, and performance. The history will be relevant to diagnosis of the device 100 and to issue resolution. The historical information can also be aggregated from many devices 100 by the mobile device diagnosis center 110, so that an individual user may benefit from the experiences of others, and from comparisons of their device 100 usage with statistics derived from such data. Data available from other sources about such devices 100 may also be acquired, maintained, and applied for diagnosis and resolution by the mobile device diagnosis center 110.

Information useful for diagnosis of a particular mobile electronic device 100 may be maintained on the device 100 itself, or by the mobile device diagnosis center 110, alone or in combination. For example, the expiry date of a credit card used to pay for either the user's service plan or for their use of the mobile device diagnosis center 110 might be maintained only on the device 100. Logic, in the form of processing hardware and software, to warn the user that credit information needs to be updated, might be executed either on the device 100 or by the mobile device diagnosis center 110, again alone or in combination. For example, software executing on the device 100 may interact and collaborate with software executing at the mobile device diagnosis center 110 to diagnose situations and make recommendations.

A situation or issue may be resolved in a number of ways. For example, the user might be sent a diagnostic message or alert. The alert could be communicated by e-mail, by text message, or might be displayed on a user interface 254 of the device 100. The alert could be audible or visual. The issue might be automatically resolved. For example, following a prior instruction received through the user interface 254, logic on the device 100 or at the center 110 may automatically swap service plans on an ongoing basis to minimize costs. The issue might be resolved by an advisor 170, represented in FIG. 1 by a laptop computer, who might run various diagnostic tests on the device, or help the user with choices about how to proceed. Similarly, issues or questions for resolution might be identified automatically by logic on the device 100 and/or the center 110, by a user of the device 100, or by an advisor 170.

FIG. 1 uses a cloud to represent an external communication system 120. This might be the Internet or cell phone communication; it might be wired or wireless; it might be local or remote. We define a communication system recursively. Any combination of communication systems (including hardware and/or software) is a communication system. Our cloud representation is generic, and does not imply that, for example, communication between an advisor 170 and a mobile electronic device 100 uses the same means as communication between the mobile device diagnosis center 110 and a mobile device service plan.

Arrows, typified by arrow 150, indicate connection to the external communication system 120. Connection from each of the represented entities to the external communication system 120 is through one or more external interfaces 151. The external interfaces 151 may utilize hardware, but will typically be implemented at least in part by software executing on a processor. A given entity may have separate interfaces 151 for communication with different external entities or for different purposes. The external interfaces of the device 153 and of the mobile device diagnosis center 110 are suggested in the figure by reference numerals associated with arrowheads.

Figure 2:
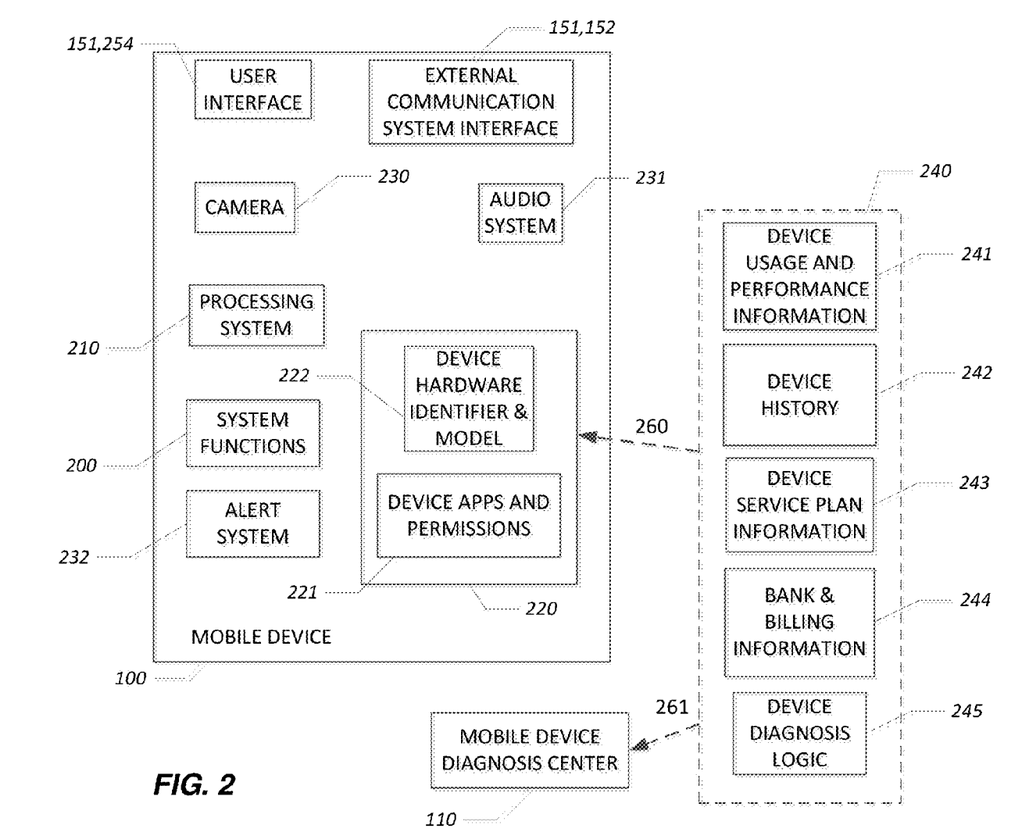
FIG. 2 is a schematic diagram illustrating components of a mobile device, and information that might be stored either the device or a mobile device diagnosis center.

FIG. 2 illustrates some components that might be included in a mobile electronic device 100. The device 100 may include a user interface 254, for communication with a user. The user interface 254 might include, for example, a touch screen, some hardware controls (e.g., buttons, dials, switches), and various ports (e.g., USB or audio). The device 100 may include one or more external interfaces 151. Operations of the device 100 are controlled by a processing system 210, some combination of hardware and software logic, the software logic being stored in tangible storage 220. The device 100 may contain tangible storage 220, which may include a hardware ID and model 222 of the device 100, and software applications 221. Some of these software applications 221 will come pre-installed on the device 100, and others may be user-installed. An app 221 may have permission, often granted through a clicking on an "Accept" button at the time of download, to access or change various device data and features (e.g., the user's contact list or GPS location). Displaying app permissions to a user is a diagnostic function, that may be performed by diagnostic logic executing, possibly executing as an application, on the device 100, possibly in collaboration with the center 110. The logic might distinguish pre-installed software, allowing the user to delete only user-installed software. The hardware ID and model 222 may be used to uniquely identify the device 100 for diagnosis, for maintaining a history of the device 100, and for accumulation to compute statistics on various sets of devices, applications, and/or service providers.

A mobile electronic device 100 has various system functions 200, which are what the device 100 actually does—activities or tasks executed through its hardware or its software. Diagnosis of the device 100 will often pertain to how well these system functions 200 are being carried out by the device 100, if at all. Alerts may be communicated to a user through an alert system 232. This alert system 232 might include, for example, the user interface 254, an audio system 231, e-mail, and/or texting. The alert system 232 might also include a still or motion camera 230.

Information about the particular device 100 might be stored on the device 100, in the center 110, or both. The dual possibilities for storage may apply to, e.g., the types of data 240 shown in the dashed box including: usage and performance information 241; device history 242; device information plan 243; bank and billing information 244 (e.g., credit card expiry date); and diagnosis logic 245. Arrows 260 and 261 suggest that the data 240 might be found in either location.

Figure 3:
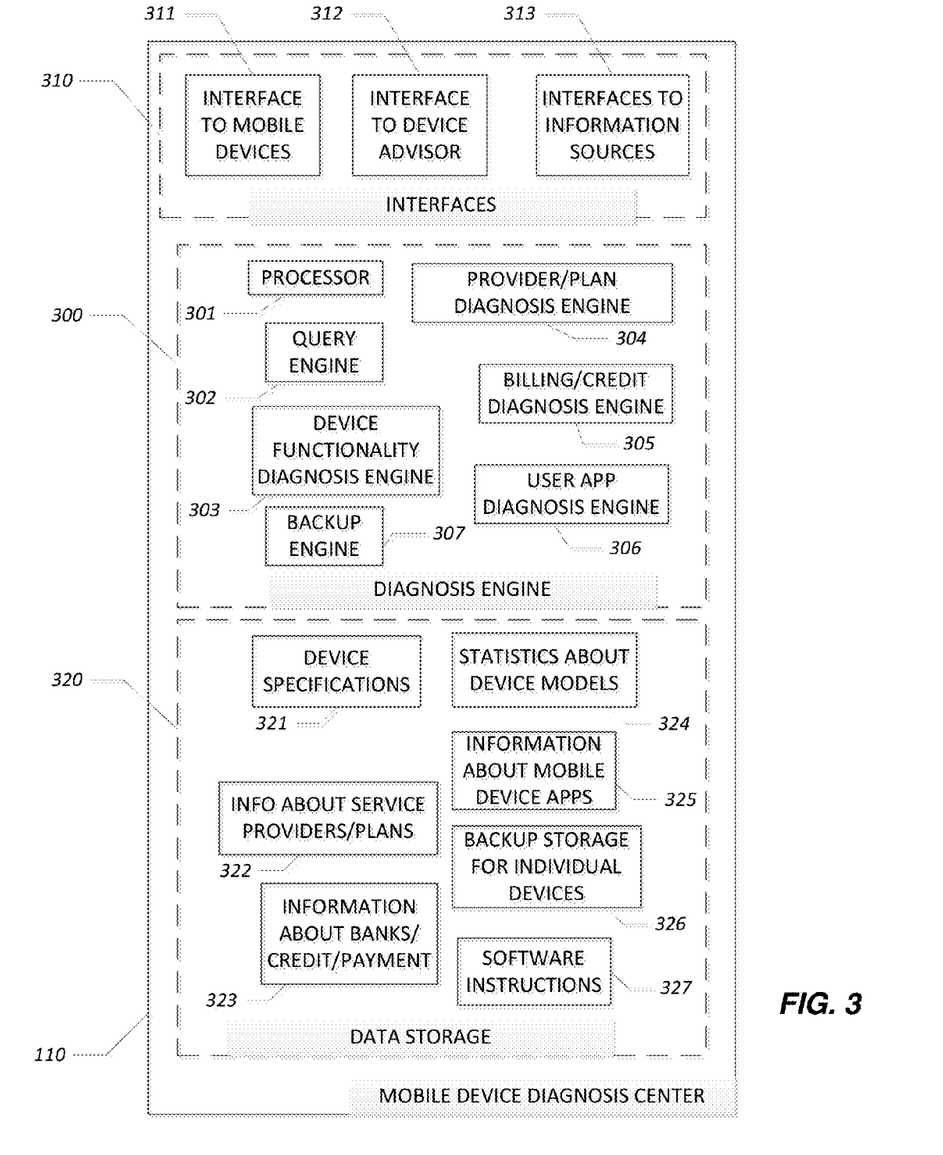
FIG. 3 is a schematic diagram illustrating components of a mobile device diagnosis center.

FIG. 3 is a schematic diagram illustrating components that may be included in a mobile device diagnosis center 110. The components are in three groups: diagnosis engine 300; interfaces 310; and stored information 320. The interfaces 310 are of three types: mobile devices interface 311; device advisor interface 312; and information sources interfaces 311.

The stored information 320, which may be saved in tangible storage, includes device specifications 321; information about service plans and providers 322; information about banks/credit/payment 323; mobile device statistical data 324; software app information 325; backup storage 326; and software instructions 327. Note that the information described here has broad applicability to many devices, as distinguished from the device- or user-specific data 240, which might be stored on either an individual device 100 or in the center 110.

The device specifications 321 might be received from a manufacturer, a vendor, or from a service provider. The device specifications 321 essentially define the components and functionality of the device, including both software and hardware, and performance expectations and metrics. The information about service plans and providers 322 may include information about what is provided in a service plan, plan costs, who is covered (e.g., an individual, or a group or family); contact information for the service plan provider 140, such as phone or e-mail for technical support and customer service; and any provider-specific modifications or additions to the device 100, such as provider software applications. The information about banks/credit/payment 323 may include payment and credit information. This information might specify payment plans and deadlines for the services of the mobile device diagnosis center 110 or of a mobile device service (e.g., cellular phone service). The mobile device statistical data 324 includes data, and statistics computed from that data, derived from the community of mobile devices 100 in operation "in the field". The software app information 325 describes individual software applications—what function they are intended to serve; what permissions they require; and how they are rated by, for example, users and reviewers.

The software instructions 327 provide logic that is used by the processor 301 to operate and maintain the mobile device diagnosis center 110. Logic executing at the mobile device diagnosis center 110 or on the mobile device 100 itself might cause changes to the mobile device 100, as part of functions instituted automatically by the logic or by the user. The backup storage 326 is a cloud-based repository that may be used to back up the mobile device 100 contents prior to executing such an operation.

The stored information 320 may include, for example, information about failures and repairs; user satisfaction with the device, application software, or service plans; adware and malware issues; and issues with software applications. Some of the data says how the device 100 ought to be performing, other data says how it actually is performing.

The process of recommendation-backup-change might be fully automated. For example, information sent by the device 100 to the center 110 might cause logic on the center 110 to send the device 100 a recommendation for a change to device 100 configuration (e.g., hardware, software, service plan, payment method). Logic on the device 100 might then transmit backup information to the center 110, which then stores the information. Perhaps after receiving an acknowledgment signal of successful completion after the backup, the device 100 then automatically executes the change to the device 100 configuration. Alternatively, the device 100 might suggest user action through a user interface 254.

Figure 4:
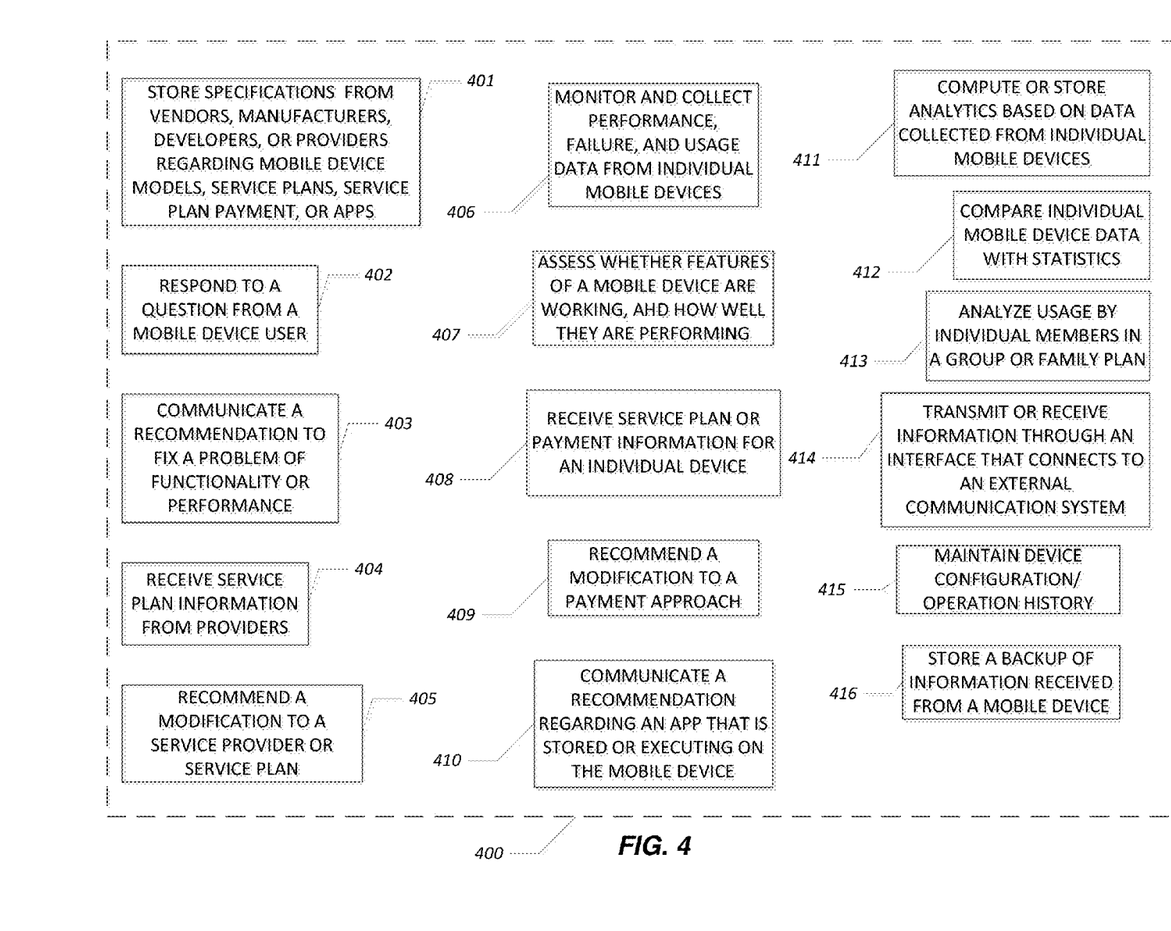
FIG. 4 is a schematic diagram illustrating steps or functions that might be performed by a mobile device diagnosis center.

FIG. 4 summarizes some mobile device diagnosis center functions 400, or steps, that may be taken by a mobile device diagnosis center 110. A given mobile device diagnosis center 110 may have some or all of these capabilities. Any process that includes at least one of these steps (in any order and possibly combined with other steps or logic), is contemplated by this Specification. The functions include: store 401 specifications from vendors, manufacturers, developers, or providers regarding mobile device models, service plans, service plan payment, or apps; respond 402 to a question from a mobile device user; communicate 403 a recommendation to fix a problem of functionality or performance; receive 404 service plan information from providers; recommend 405 a modification to a service provider or service plan; monitor and collect 406 performance, failure, and usage data from individual mobile devices; assess 407 whether features of a mobile device are working, and how well they are performing; receive 404 service plan or payment information of an individual device; recommend 409 a modification to a payment approach; communicate 410 a recommendation regarding an app that is stored or executing on the mobile device; compute or store 411 analytics based on data collected from individual mobile devices; compare 412 individual mobile device data with statistics; analyze 413 usage by individual members in a group or family plan; transmit or receive 414 information through an interface that connects to an external communication system; maintain 415 device configuration/operation history; and store 416 a backup of information received from a mobile device.

Figure 5:
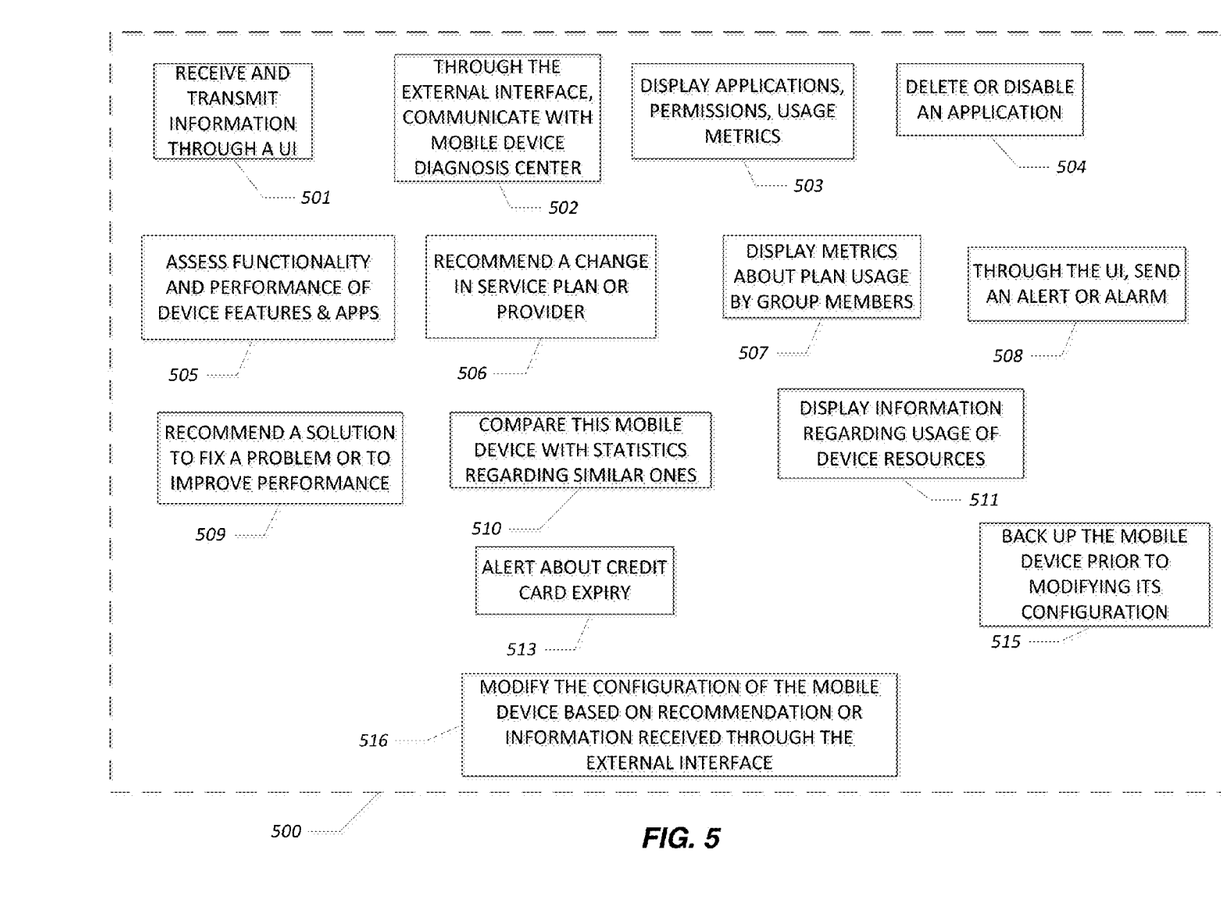
FIG. 5 is a schematic diagram illustrating steps or functions that might be performed by a mobile electronic device.

FIG. 5 summarizes some mobile device functions 500 that may be performed by a mobile electronic device 100. Any combination of these actions, in any order and possibly in combination with actions described elsewhere in this document, may form methods of the invention. The functions include: receive and transmit 501 information through a user interface; through the external interface, communicate 502 with a mobile device diagnosis center 110; display 503 applications, permissions, usage metrics; delete or disable 504 an application; assess 505 functionality and performance of device features and apps; recommend 506 a change in service plan or provider; display 507 metrics about plan usage by group members; through the UI, send 508 an alert or alarm; recommend 509 a solution to fix a problem or to improve performance; compare 510 this mobile device with statistics regarding similar ones; display 511 information regarding usage of device resources; alert 513 about credit card expiry; back up 515 the mobile device prior to modifying its configuration; and modify 516 the configuration of the mobile device based on recommendation or information received through the external interface.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A system, comprising:
   a) a mobile device interface that communicates with portable mobile electronic devices that are external to the system;
   b) an information source interface that communicates with sources of information, which are external to the system;
   c) tangible storage containing mobile device information, which includes
      (i) data, received through the information source interface, about types of portable mobile devices, including respective hardware and software configurations,
      (ii) usage statistics derived from a plurality of individual portable mobile electronic devices, and
      (iii) historical information, received through the mobile device interface, about individual portable mobile electronic devices; and
   d) a recommendation engine, which upon receiving an indication that an issue exists regarding a first portable mobile electronic device, of a given device type, will formulate a recommendation using the mobile device information, and transmit the recommendation through the mobile device interface, wherein the recommendation engine, in formulating the recommendation, will perform a diagnosis of whether certain factors are relevant and, if so, base the recommendation upon the relevant factors, the analyzed factors including
      (i) specifications about components and functionality of the given device type,
      (ii) historical changes made to the first mobile portable electronic device, and
      (iii) statistical information collected from a plurality of portable mobile electronic devices that pertains to the device type.

2. The system of claim 1, wherein an information source for the specifications is a manufacturer or vendor of portable mobile electronic devices.

3. The system of claim 1, wherein an information source is a portable mobile electronic device service provider and wherein the factors further include
   (iv) an assessment of appropriateness for users of a service plan covering the first portable mobile electronic device from the service provider.

4. The system of claim 1, wherein the specifications include performance specifications.

5. The system of claim 1, wherein the data includes frequency of repair information.

6. The system of claim 1, wherein the specifications specify which software was pre-installed on the mobile device by a manufacturer or a service plan provider.

7. The system of claim 1, wherein the historical changes include changes to hardware components.

8. The system of claim 1, wherein the historical changes include changes to software applications.

9. The system of claim 1, wherein the historical changes include repairs.

10. The system of claim 1, wherein the historical information includes information about past recommendations.

11. The system of claim 1, wherein the factors further include
   (iv) a comparison between usage of the first portable mobile electronic device and the usage statistics.

12. The system of claim 1, wherein the recommendation is based, at least in part, upon the historical information.

13. The system of claim 1, wherein the recommendation recommends a specific type of repair.

14. The system of claim 1, wherein the recommendation recommends that a software application be removed or disabled.

15. The system of claim 1, wherein the mobile device information further includes
   (iv) data about mobile device service providers and service plans.

16. The system of claim 15, wherein the recommendation is to change to a different service plan.

17. The system of claim 15, wherein the recommendation is to change to a different service provider.

18. The system of claim 1, wherein the mobile device information further includes
   (iv) financial information relating to the first mobile device.

19. The system of claim 18, wherein the recommendation includes an alert that a credit or debit card expiry is imminent.

20. The system of claim 1, wherein the mobile device information further includes
   (iv) a repository that contains backup data from a plurality of mobile devices.

21. The system of claim 1, wherein the recommendation directs the portable mobile electronic device to automatically change its hardware configuration or its software configuration.

22. A portable mobile electronic device, comprising:
   a) a user interface;
   b) tangible storage;
   c) a diagnostic engine that analyzes functionality and performance of components on the device, utilizing
      (i) processing hardware, and
      (ii) diagnostic software, stored in the tangible storage; and
   d) an interface to a communication system that is external to the device, whereby the device
      (i) transmits information about an issue identified by the diagnostic engine, and
      (ii) receives a recommendation that addresses the issue, wherein the recommendation is based upon a diagnosis of the relevance of certain factors for resolving the issue, the factors including
         (A) specifications about components and functionality of the type of the portable mobile electronic device,
         (B) historical changes made to the portable mobile electronic device, and
         (C) statistical information collected from a plurality of portable mobile electronic devices that pertains to the device type.

23. The portable mobile electronic device of claim 22, the factors further including
   (D) a comparison between usage of the first portable mobile electronic device and the usage statistics.

24. The portable mobile electronic device of claim 22, wherein the recommendation is based, at least in part, upon archived historical information about the device.

25. The portable mobile electronic device of claim 22, wherein the recommendation recommends a specific type of repair.

26. The portable mobile electronic device of claim 22, wherein the recommendation recommends that a software application be removed or disabled.

27. The portable mobile electronic device of claim 22, wherein the recommendation identifies imminent expiry of validity of a credit or debit card.

28. The portable mobile electronic device of claim 22, wherein the recommendation is to change a service provider or a service plan.

29. The portable mobile electronic device of claim 22, wherein the device is a phone, a portable music player, or a tablet device.

30. The portable mobile electronic device of claim 22, wherein logic in the device takes action, which affects the configuration of the device, based on the recommendation.

31. The portable mobile electronic device of claim 22, wherein the device automatically transmits backup information through the interface prior to taking the action.

32. The system of claim 22, wherein the recommendation directs the portable mobile electronic device to automatically change its hardware configuration or its software configuration.

33. The system of claim 32, wherein the portable mobile electronic device automatically changes its hardware configuration or its software configuration in response to the recommendation.

34. A method, comprising:
   a) maintaining a portable mobile electronic device information center that includes
      (i) specifications of hardware and software configurations of types of such devices,
      (ii) information about wireless service providers and service plans,
      (iii) statistical information regarding usage, performance, and repairs of such devices,
      (iv) historical archives for particular devices about usage, performance, issues, and repairs;
   b) receiving information about a particular portable mobile electronic device through an interface to a communication system that is external to the center;
   c) storing the information about the particular portable mobile electronic device in a historical archive corresponding to the particular portable mobile electronic device;
   d) receiving a request from the particular device to resolve an issue regarding configuration of the portable mobile electronic device;
   e) performing a diagnosis of relevance of the following factors for resolving the issue:
      (i) specifications about components and functionality of the given device type,
      (ii) historical changes made to the portable mobile electronic device, and
      (iii) statistical information collected from a plurality of portable mobile electronic devices that pertains to the device type; and
   f) sending a recommendation, based on the diagnosis, for a change to the particular portable mobile electronic device through the communication system.

35. The system of claim 34, wherein the recommendation directs the portable mobile electronic device to automatically change its hardware configuration or its software configuration.

* * * * *